Patented Aug. 6, 1946

2,405,343

UNITED STATES PATENT OFFICE 2,405,343

RUBBER HYDROCHLORIDE COMPOSITIONS

James P. Chittum and George E. Hulse, Passaic, N. J., assignors to United States Rubber Company, New York, N. Y., a corporation of New Jersey No Drawing. Application November 17, 1939, Serial No. 305,006

6 Claims. (Cl. 260—771)

This invention relates to new compositions of matter comprising rubber-hydrogen chloride reaction products, particularly to transparent films and lacquers.

An object of the invention is to provide a new class of photochemical inhibitors for rubber hydrochloride films, particularly for transparent rubber hydrochloride films. Other objects will be apparent from the following description.

Hitherto the effectiveness of chemical stabilizers of rubber hydrochloride has been limited by their lack of solubility in the film, their volatility from the film, or discoloration of the film on aging.

The present invention provides chemicals which are compatible with rubber hydrochloride and which enable the production of films which are clear and free from haze or color and which do not discolor during light aging. The chemicals furthermore do not impart any odor to the films which makes their use as wrappers for food materials desirable. Compared with other chemicals previously used for the purpose the films of the present invention retain their usefulness longer because of better retention of strength and flexibility.

Broadly the invention comprises the use, as chemical stabilizers in rubber hydrochloride compositions, of the reaction product of an aldehyde and an ethylene polyamine. The aldehyde may be aliphatic for example butyraldehyde, propionaldehyde.

The rubber hydrochloride may be produced by passing hydrogen chloride gas into a rubber cement, as disclosed by Bradley and McGavack (U. S. Patent 1,519,659), or by reacting rubber with hydrogen chloride gas at a low temperature (disclosed by Gebauer-Fullnegg and Moffet U. S. P. 1,980,396) or by any other method.

If the rubber hydrochloride is sufficiently soluble it can be made into a cement to which the reaction product of an aldehyde and an ethylene polyamine is added in such amount as has been determined by experiment to give effective protection against light aging. The cement may then be cast into film or used as a lacquer.

Some products of rubber and hydrogen chloride are not sufficiently soluble to form spreading cements. The reaction product of an aldehyde and an ethylene polyamine may be incorporated into such rubber hydrochlorides by milling on a rubber mill. Films can then be produced by calendering the mixture.

Rubber hydrochloride films having incorporated therein the product of reaction of the aldehyde and ethylene polyamine in accordance with the invention have been found to be more resistant to deterioration upon exposure to light than films containing no added stabilizer.

The following table illustrates the improvements in aging obtained by incorporating 2% by weight of the reaction product of an aldehyde and an ethylene polyamine in transparent films of rubber hydrochloride:

| Stabilizer | Hrs. of exposure until brittle |
|---|---|
| None | 35 |
| Butyral triethylene tetramine | 60 |
| Butyral diethylene triamine | 60 |

The films (thickness, .001 inch) were aged in a standard Fade-Ometer at 110° F.

The reaction of aldehydes and ethylene polyamines is carried out by refluxing a mixture of one to two mols of an aldehyde and one mol of amine at an elevated temperature with or without the use of a small amount of an acid, organic or inorganic. Typical examples are given by Cadwell, U. S. Patent 1,843,443.

The new stabilizers may be used with rubber hydrochlorides having any hydrogen chloride content in the range commercially available, and especially with rubber hydrochloride having a hydrogen chloride content of over 30% and being in the form of transparent film suitable for photographic film or for wrapping purposes.

The rubber hydrochloride stabilized by the chemicals disclosed herein may be used in various forms and for the various purposes for which rubber hydrochloride compositions are generally known to be used.

Having thus described our invention, what we claim and desire to protect by Letters Patent is:

1. A rubber hydrochloride composition containing a small amount of the reaction product of an aliphatic aldehyde and an ethylene polyamine, said small amount being sufficient to stabilize the rubber hydrochloride.

2. A rubber hydrochloride composition containing a small amount of butyral-triethylene tetramine, said small amount being sufficient to stabilize the rubber hydrochloride.

3. A rubber hydrochloride composition containing a small amount of butyral-diethylene triamine, said small amount being sufficient to stabilize the rubber hydrochloride.

4. A rubber hydrochloride composition containing a small amount of the reaction product of an aliphatic aldehyde and a polyethylene polyamine, said small amount being sufficient to stabilize the rubber hydrochloride.

5. A rubber hydrochloride composition containing a small amount of the reaction product of an aliphatic aldehyde and a polyethylene polyamine in which the terminal amino groups are primary amino, said small amount being sufficient to stabilize the rubber hydrochloride.

6. A pellicle comprising a rubber hydrochloride composition containing a small amount of the reaction product of an aliphatic aldehyde and a polyethylene polyamine in which the terminal amino groups are primary amino, said small amount being sufficient to stabilize the rubber hydrochloride.

JAMES P. CHITTUM.
GEORGE E. HULSE.